Dec. 19, 1961   D. A. FREEMAN   3,013,704
DEVICE FOR FOLDING GARMENTS
Filed Feb. 17, 1959   10 Sheets-Sheet 1
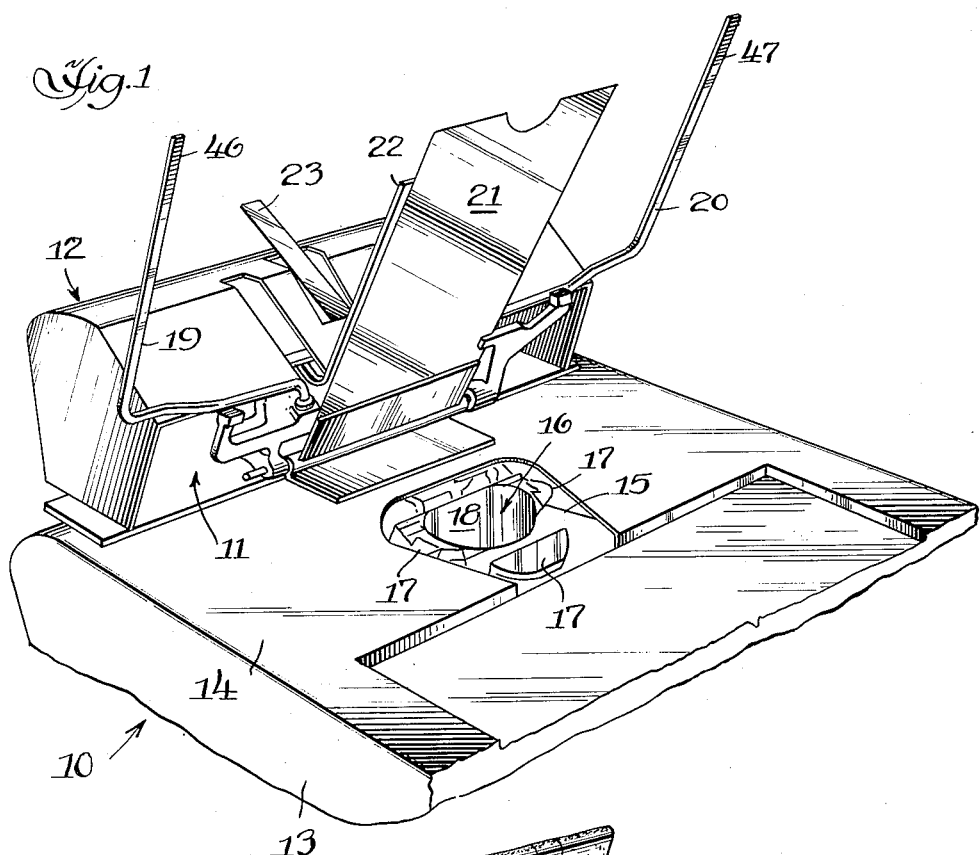
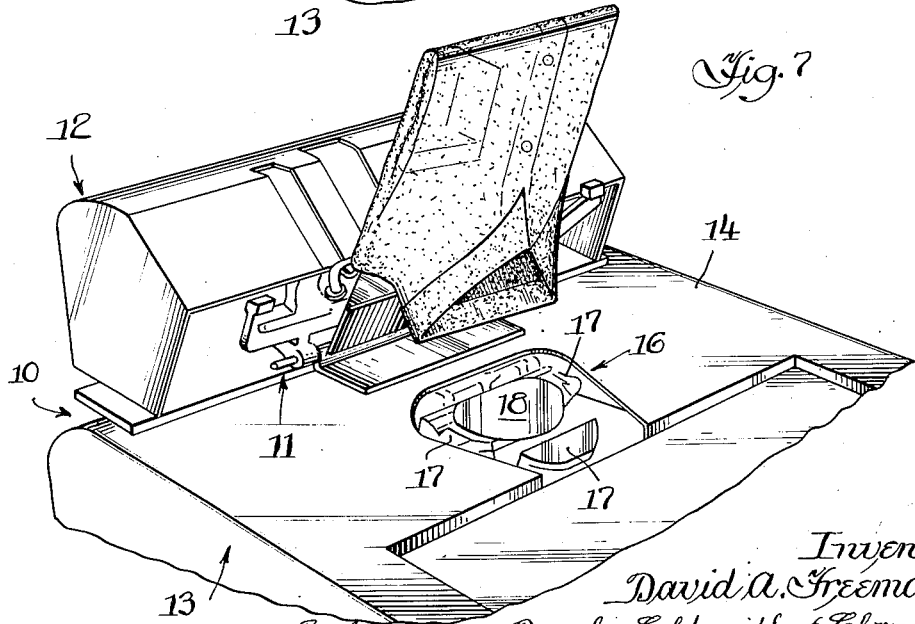
Inventor,
David A. Freeman,
By Schneider, Dressler, Goldsmith & Clement,
Attys.

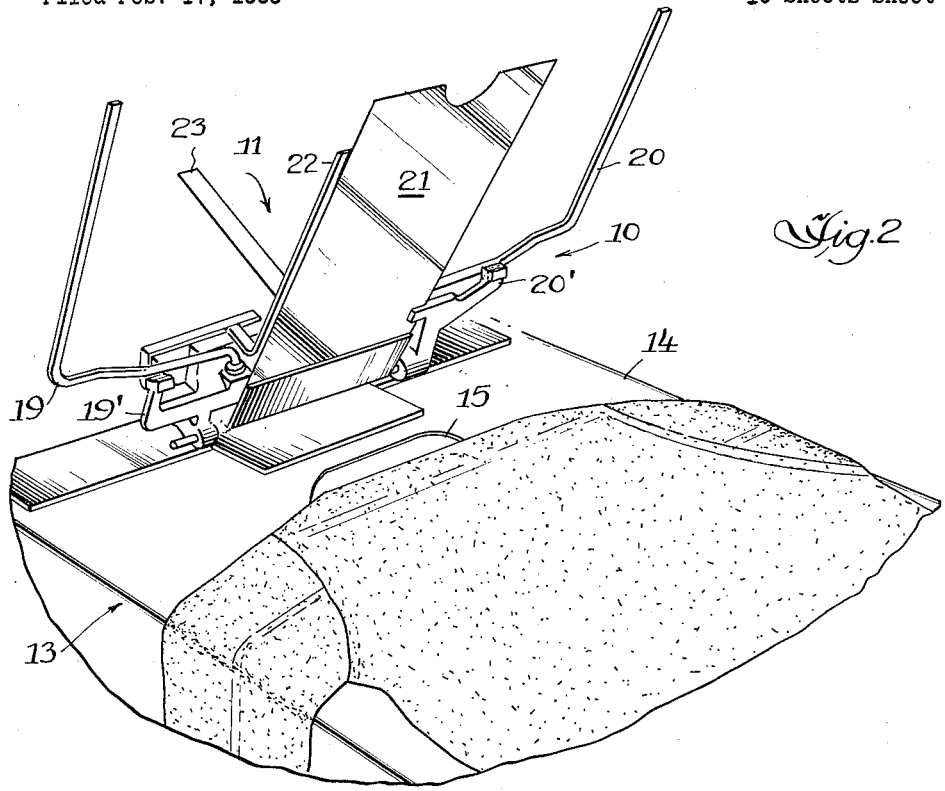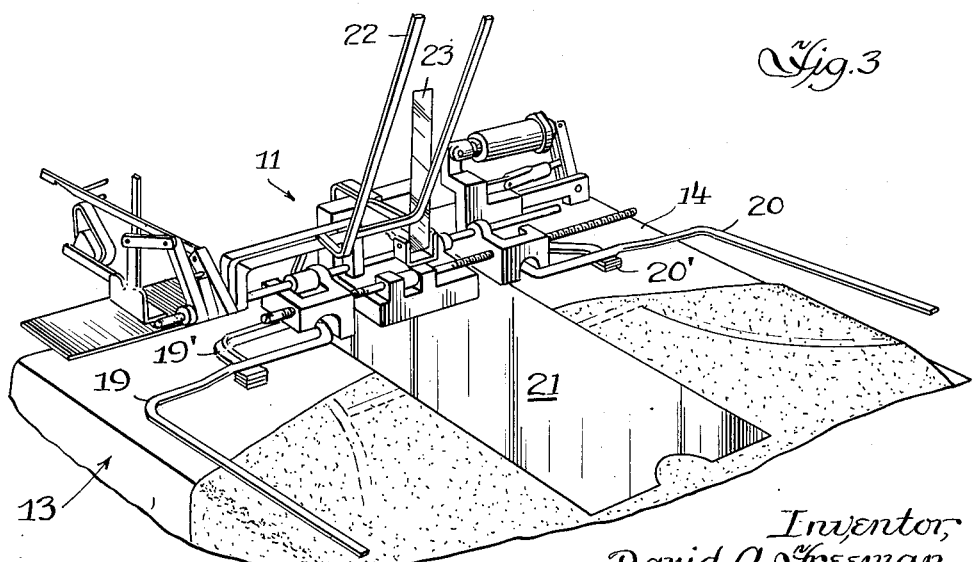

Dec. 19, 1961    D. A. FREEMAN    3,013,704
DEVICE FOR FOLDING GARMENTS
Filed Feb. 17, 1959    10 Sheets-Sheet 3
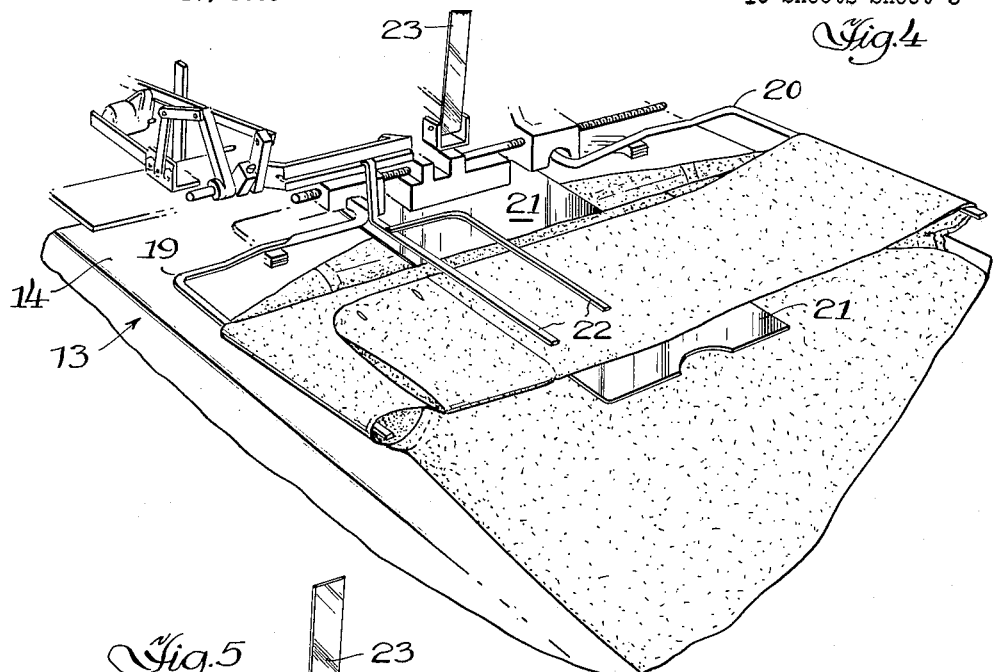
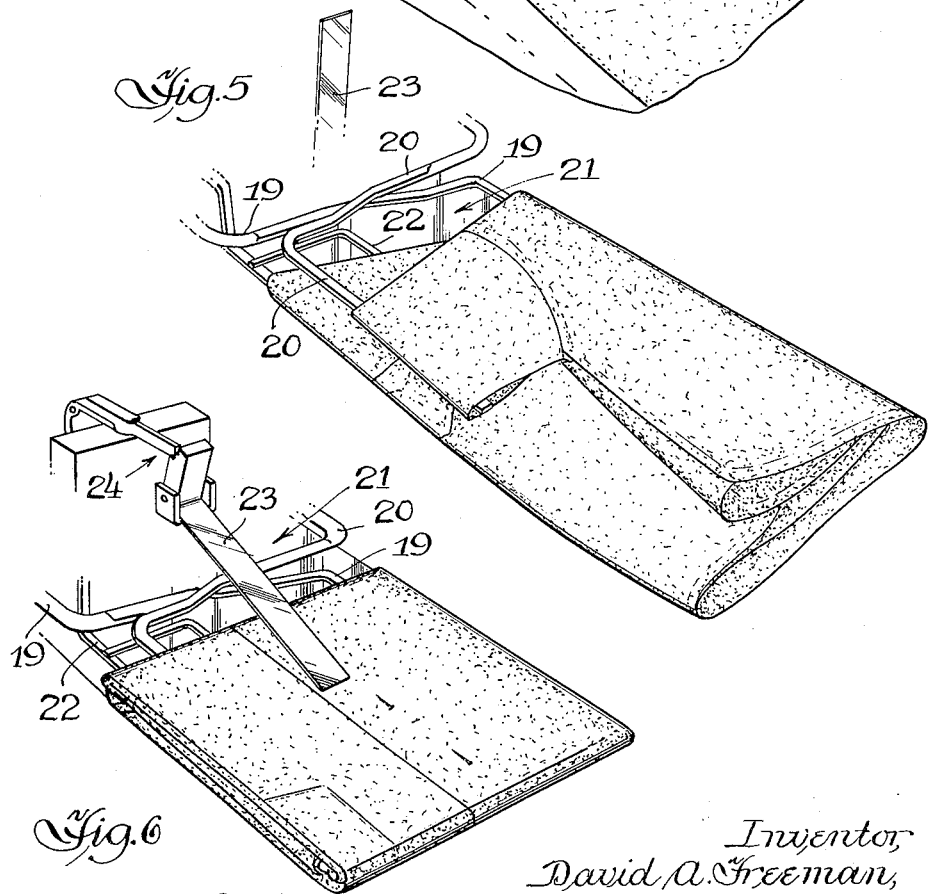
Inventor
David A. Freeman,
By Schneider, Dressler, Goldsmith & Clement, Attys.

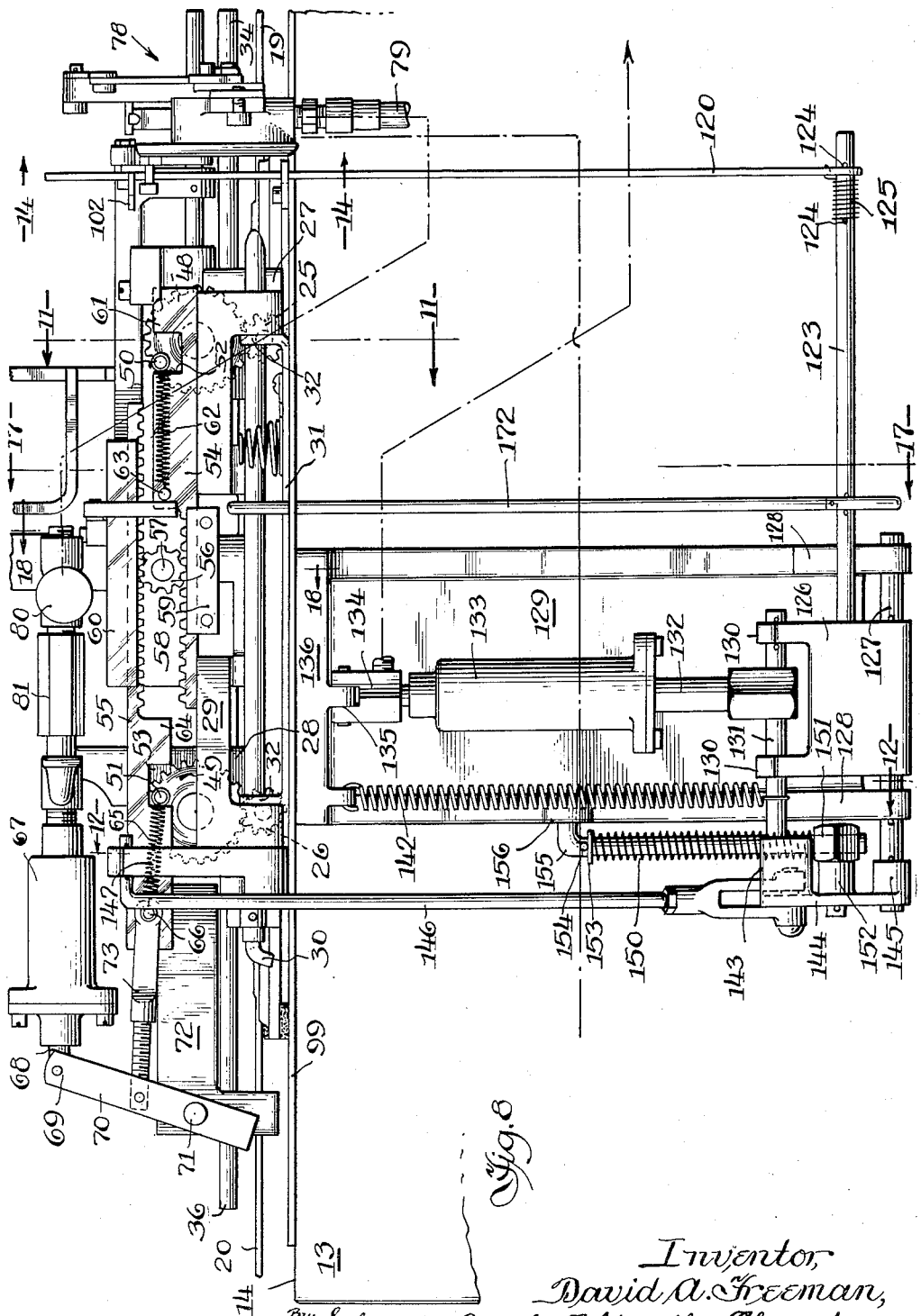

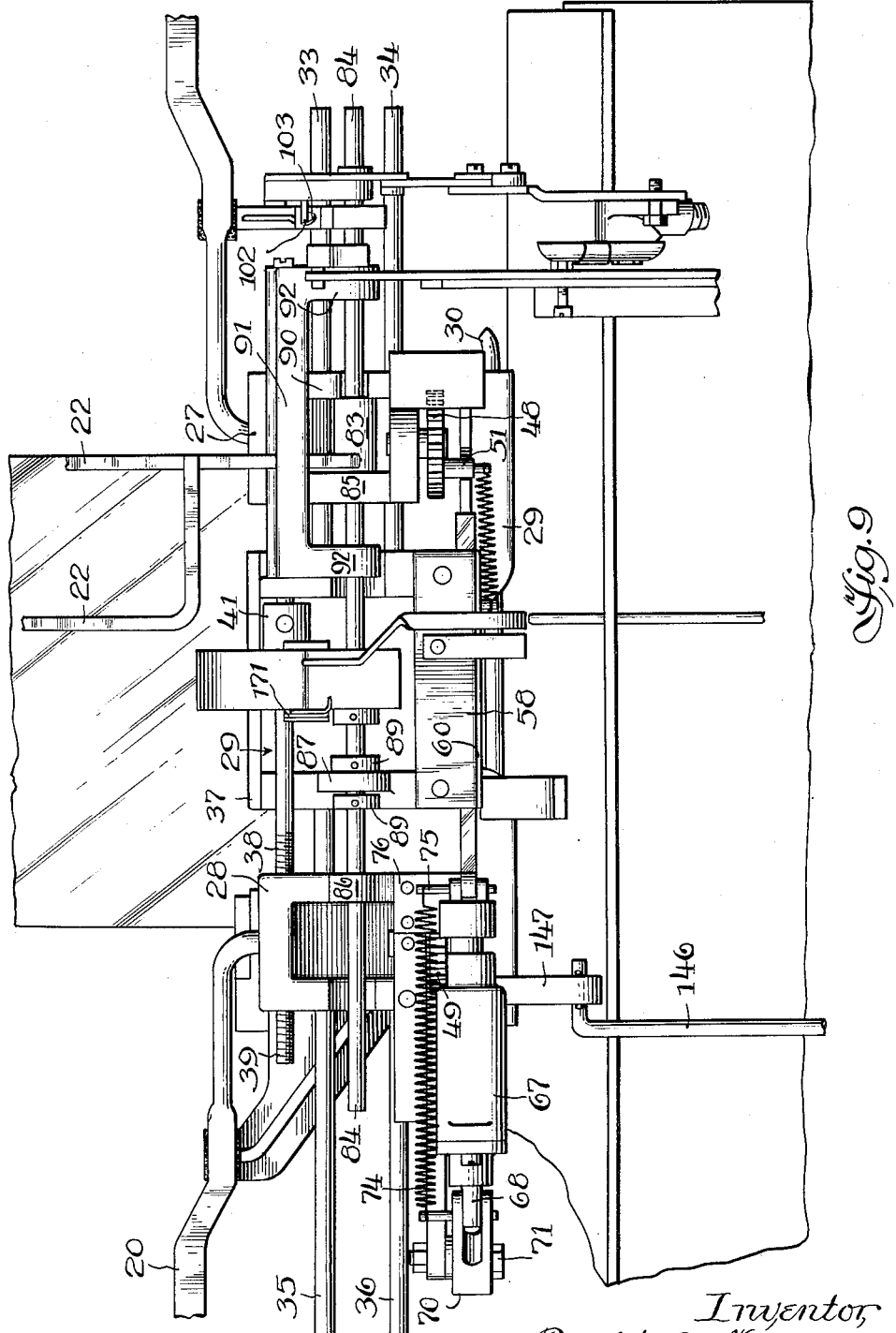

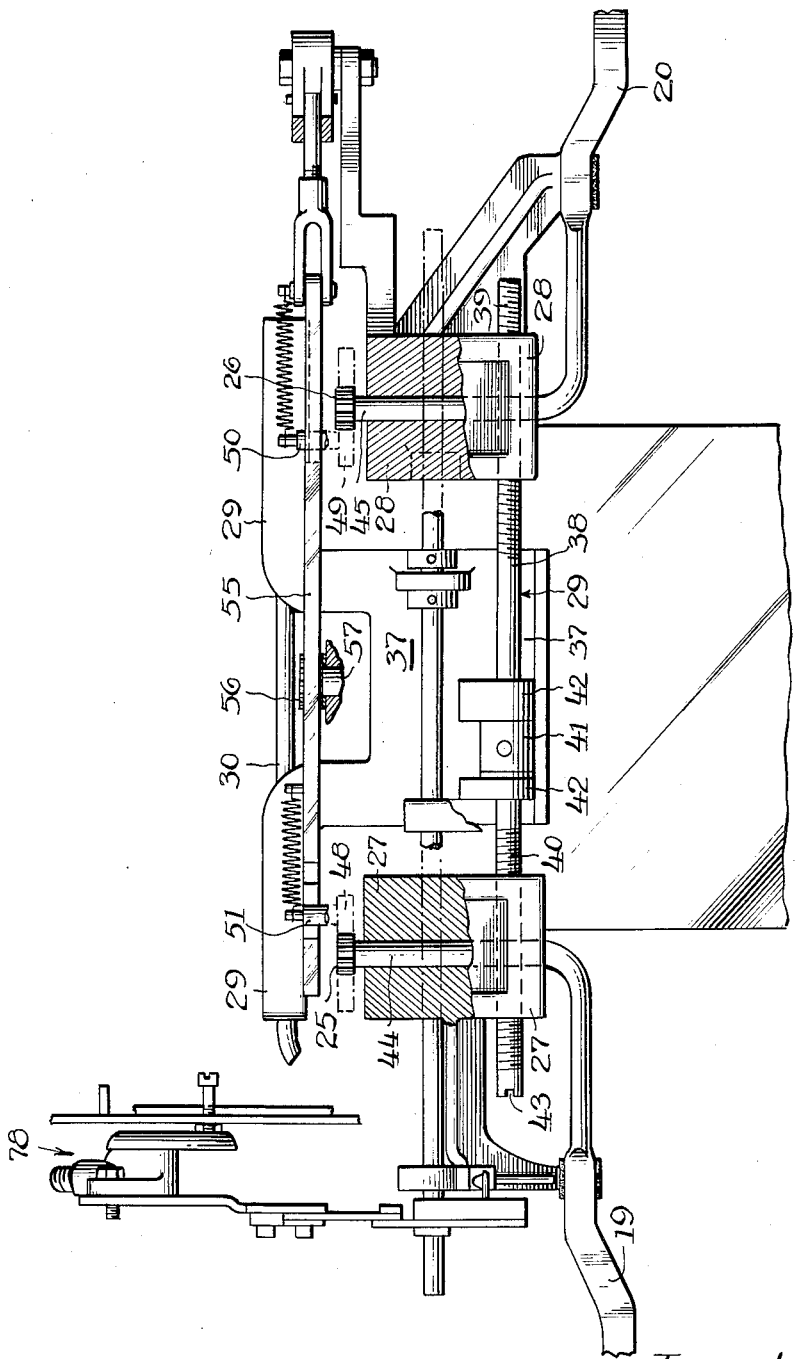

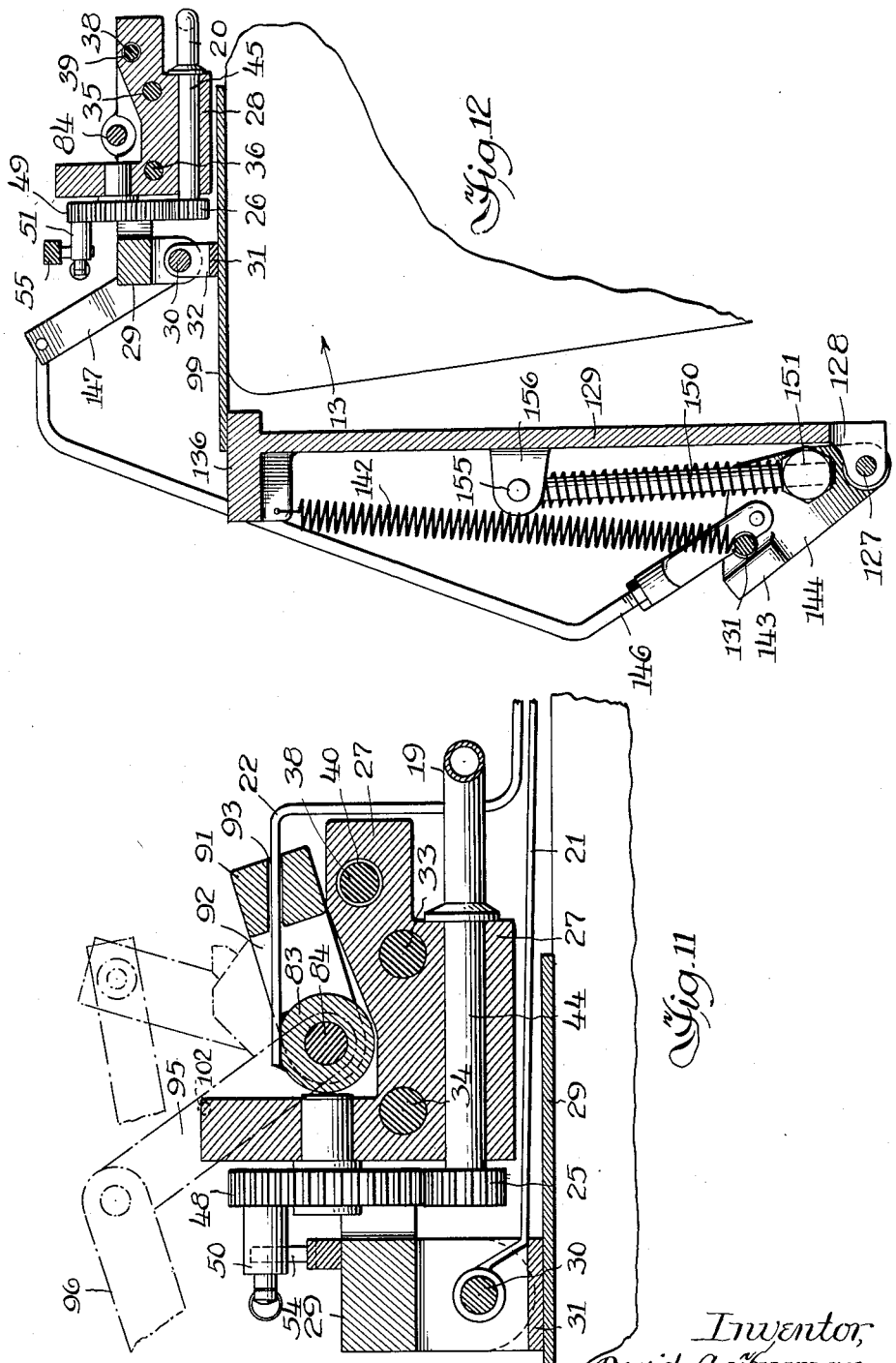

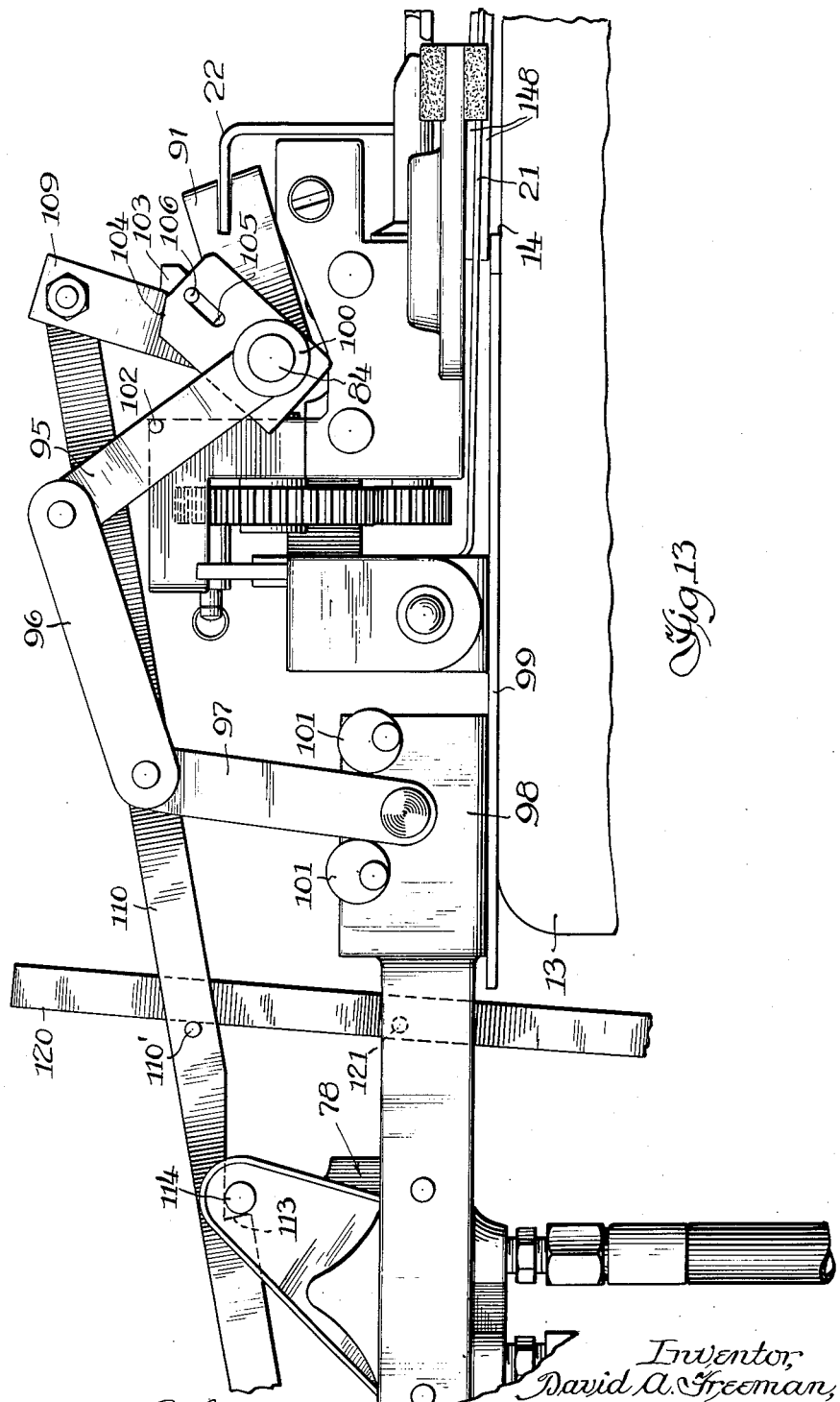

Dec. 19, 1961 D. A. FREEMAN 3,013,704
DEVICE FOR FOLDING GARMENTS
Filed Feb. 17, 1959 10 Sheets-Sheet 9
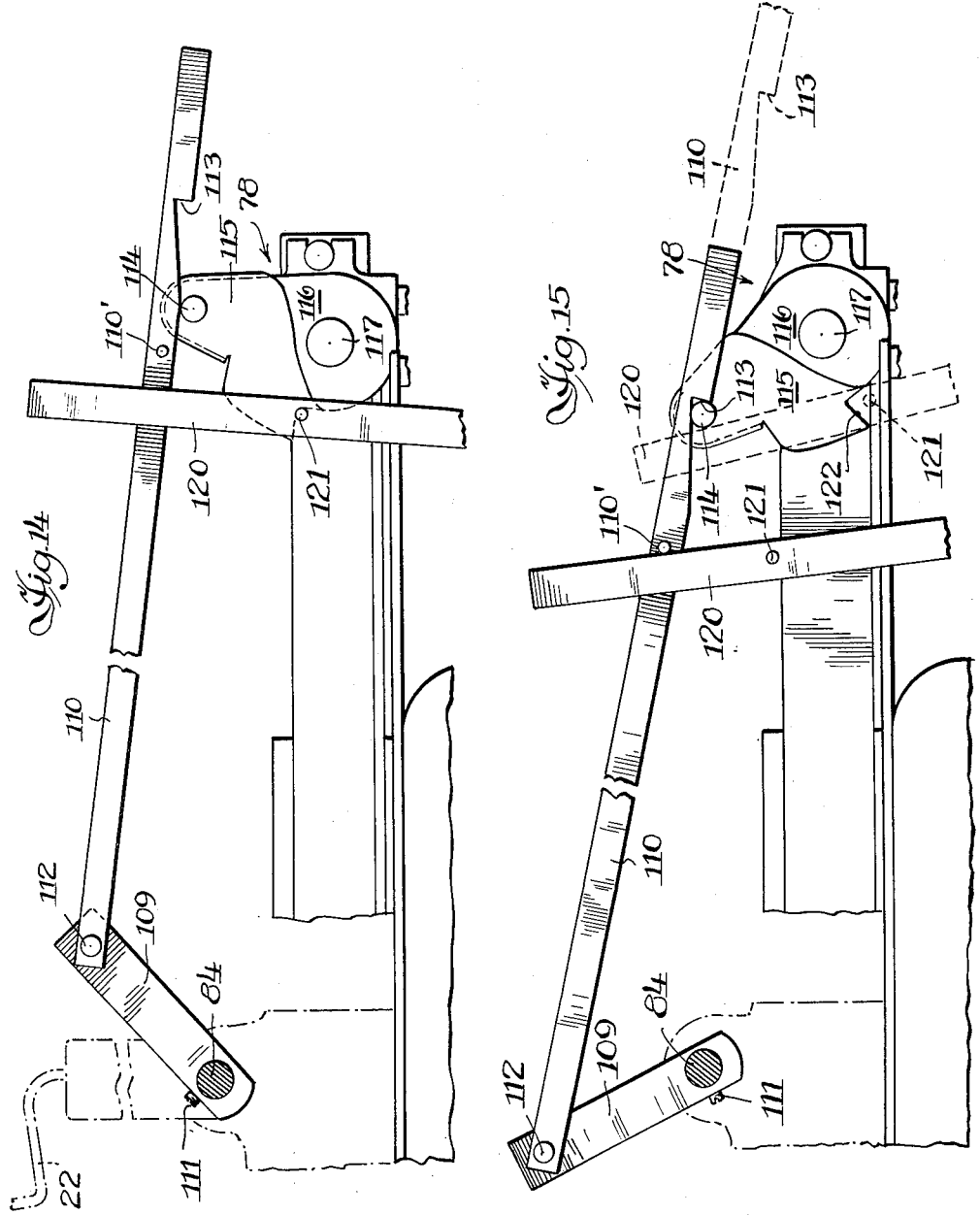
Inventor,
David A. Freeman,
By: Schneider, Dressler, Goldsmith & Clement,
Attys.

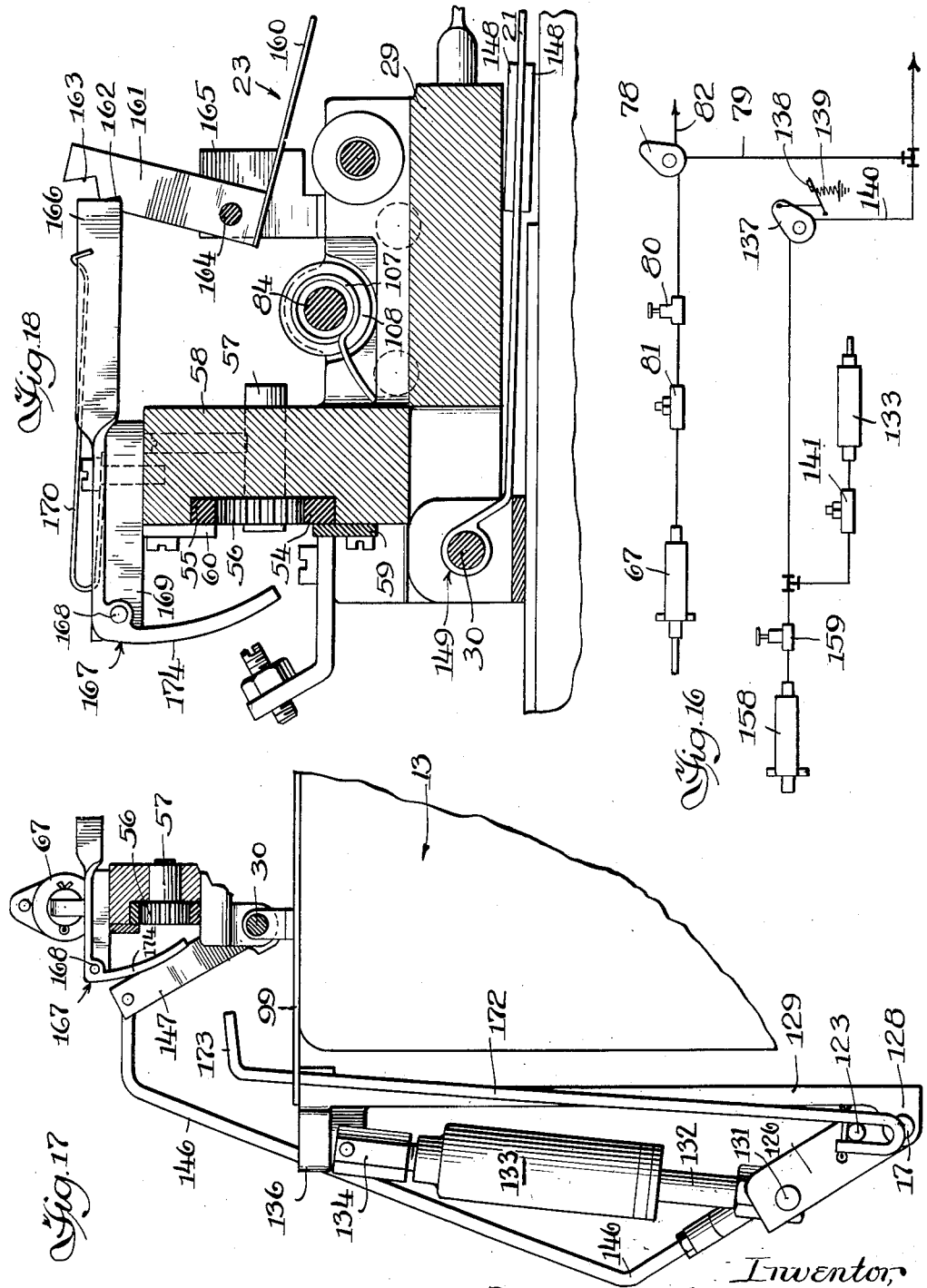

United States Patent Office 3,013,704
Patented Dec. 19, 1961

3,013,704
DEVICE FOR FOLDING GARMENTS
David Abraham Freeman, % Drake Hotel, 140 E. Walton
St., Chicago, Ill.
Filed Feb. 17, 1959, Ser. No. 793,818
19 Claims. (Cl. 223—37)

The present invention relates to folding devices and more particularly to devices for folding garments such as shirts, blouses and pajama tops, etc.

Embodiments of the present invention have utility and provide for improved operations in the laundering and dry cleaning industry and in the garment manufacturing industry with respect to innumerable forms of garments. For convenience, however, an exemplary and illustrative embodiment of the invention is described hereinbelow and illustrated in the accompanying drawings which are incorporated herein as a part hereof, in conjunction with shirt folding. In should be understood, of course, that the invention is not limited to either shirt folding or the embodiment of the invention shown and described.

In the aforementioned industries the folding of the garment, hereinafter referred to as a shirt, is very important. It has been found that consumers prefer that shirts be folded in a particular manner and that if they are folded otherwise, they are not well received. Further, the folded shirt must have a neat and tidy appearance and shirts of the same origin must be uniformly folded to be acceptable.

This places a substantial burden on the shirt folder who, as is generally the case, is required to work rapidly throughout the working day. She must also work efficiently so that she does not create a bottleneck in a shirt finishing team of which she is one member.

Embodiments of the present invention substantially reduce the work load on the shirt folder by automatically performing many of the folding operations. In addition, they may be cooperatively arranged with a collar forming and molding mechanism so that the finished, folded shirts are neat and attractive, and are uniformly folded with a minimum allowance for human error by the shirt folder-operator of the mechanism.

Devices embodying this invention are effective to automatically fold at least the shoulder and body portions of the shirt and to hold the shirt in a folded condition while the operator is banding or pinning or bagging the shirt. These devices are also operable to automatically reset themselves in preparation for folding another shirt as soon as a folded shirt is removed therefrom. The devices have incorporated therein a plurality of automatically driven folding arms which engage the shirt and successively fold various portions thereof about a pattern blade. The folding arms may be driven in a number of ways and in the embodiment of the invention described below, pneumatic actuators are employed.

An illustrative embodiment of the present invention is shown in detail in the accompanying drawings in which like reference numerals refer to like parts and in which:

FIGURE 1 is a perspective view of a shirt folding mechanism embodying the principles of the present invention and mounted on a shirt folding table for cooperative operation in conjunction therewith and with a collar molding mechanism therein;

FIGURE 2 is a view similar to FIGURE 1 but showing a shirt in place on the table with the collar of the shirt overlying the collar mold and with the cover and various parts of the shirt folding mechanism removed for clarity;

FIGURE 3 is a view similar to FIGURE 2 but showing the folding blade and arms in a lowered position and showing many other parts of the mechanism;

FIGURE 4 is a view similar to FIGURE 3 but showing the sleeves of the shirt folded over the folding arms and blade and showing the hold-down arm in a lowered position;

FIGURE 5 is a view similar to FIGURE 4 but showing the folding arms in a closed or shirt folded position;

FIGURE 6 is a view similar to FIGURE 5 but showing the shirt fully folded and the tail clamp lowered to a shirt clamping position;

FIGURE 7 is a view similar to FIGURE 1 showing the mechanism in an elevated position but having the shirt thereon prior to removal of the shirt from the mechanism;

FIGURE 8 is a rear elevational view of the mechanism with the cover removed therefrom and showing the mechanism in a position with the folding arms and blade in a lowered position;

FIGURE 9 is a fragmental rear elevational view of the mechanism, the view being similar to FIGURE 8, but with the mechanism shown with the arms and blade in a raised or elevated position;

FIGURE 10 is a fragmental plan view of the mechanism shown partly in section and with parts removed therefrom to better illustrate other parts of the mechanism;

FIGURE 11 is a sectional view taken substantially along the line 11—11 of FIGURE 8 and in addition showing, in phantom lines, the hold-down arm linkage and the arm control valve operating linkage;

FIGURE 12 is a sectional view taken substantially along the line 12—12 of FIGURE 8;

FIGURE 13 is a fragmental left-side elevational view of the mechanism;

FIGURE 14 is a fragmental sectional view taken substantially along the line 14—14 of FIGURE 8 and showing the arm control valve operating mechanism in its position with the folding arms in a lowered position and with the hold-down arm in a raised position;

FIGURE 15 is a fragmental sectional view similar to FIGURE 14 but showing the valve and valve operating linkage in a position with the hold-down arm lowered, and further showing the operating linkage with both the blade, the folding arms and the hold-down arm in a raised position;

FIGURE 16 is a schematic or diagrammatic illustration of the pneumatic system for controlling and operating the mechanism;

FIGURE 17 is a fragmental sectional view taken substantially along the line 17—17 of FIGURE 8; and FIGURE 18 is a fragmental sectional view taken substantially along the line 18—18 of FIGURE 8.

An illustrative embodiment of the present invention is shown in several successive, sequential stages of its operation for folding a shirt semi-automatically by pneumatic operation in FIGURES 1–7, inclusive. The mechanism is shown at 10 in FIGURE 1 as an enclosed shirt folding mechanism 11, enclosed by a casing 12, and mounted on a shirt folding table 13 at the end of the table. The table top 14 has an aperture 15 therein exposing a collar molding mechanism 16. As is described in detail hereinbelow, the collar molding mechanism operates in coordination with the folding mechanism so that the two mechanisms cooperatively interact to provide for efficient collar molding and shirt folding in a single operation.

The mechanism is shown in FIGURE 1 in fully open position ready for use. The operator then approaches the machine holding a shirt with its collar button buttoned so that the neckband forms a complete closed loop. The sequential steps of the folding operation by the mechanism and the operator working therewith are performed in the following manner with reference to FIGURES 1 through 7, respectively:

(1) The operator depresses a foot pedal to operate the pneumatic system to contract the collar mold, i.e., causing the molding blocks 17 to move toward the center of the collar mold under the canopy 18. Then, with the mold contracted, the operator places the neckband of the shirt collar over the mold and releases the foot pedal causing the pneumatic system to release the mold and permitting the molding blocks to move outwardly from under the canopy and expand to mold and hold the shirt collar and neckband. At the same time, the operator straightens the shirt, aligning the buttoning strip and smoothing the shoulders and tail of the shirt. This position of the shirt is shown in FIGURE 2.

(2) As shown in FIGURE 3, the folding arms 19 and 20 and the folding blade 21 are then manually lowered to overlie the shirt. The folding or pattern blade 21 overlies the neck, yoke and central shoulder and back potrion of the shirt.

(3) The sleeves of the shirt are then manually folded to the position shown in FIGURE 4 over the folding blade 21 and the folding arms 19 and 20.

When the sleeves have been folded, the operator then manually lowers the hold-down arm 22 which clamps the sleeves of the shirt over the folding blade 21.

(4) The lowering of the hold-down arm 22 sets the pneumatic-mechanical system in operation to automatically cause the folding arms 19 and 20 to successively move to the position shown therefor in FIGURE 5. The automatic system is so arranged that the folding arm 19 moves from its position shown in FIGURE 4 to its position shown in FIGURE 5 prior to the movement of the folding arm 20 from the position shown in FIGURE 4 to the position shown in FIGURE 5. This sequence of movement of the arms 19 and 20 is preferred so that the hold-down arm 22 will cooperate with the folding arm 19 to provide a smooth straight fold for the left side of the shirt body and tail and the left sleeve of the shirt when the arm 19 moves from an open position to a folded position. When the arm 19 is in its folded or closed position, it cooperates with the arm 20 to provide a straight smooth fold for the right side of the body and tail and the right sleeve of the shirt.

(5) Following the automatic operation of the folding arms 19 and 20, the tail and body of the shirt are manually folded to the position shown in FIGURE 6 from the position shown in FIGURE 5. After the shirt is fully folded a tail clamp 23 is lowered and set into position and held in place by a tail clamp lock 24.

(6) After the shirt is fully folded as shown in FIGURE 6, the operator then depresses the foot pedal to cause the pneumatic system to contract the collar mold to release the neckband of the collar of the shirt. Operation of the pneumatic system at this time also is effective to raise the entire shirt and shirt folding mechanism to the elevated position shown in FIGURE 7.

(7) While holding the foot pedal depressed, the operator places a bag over the shirt and removes the shirt from the shirt folding and collar molding mechanism. Upon release of the foot pedal the pneumatic system operates to automatically return the mechanism to the starting position shown in FIGURE 1.

Thus, it will be observed that a substantial portion of the fatiguing work of the operator is eliminated by the semi-automatic operation of the shirt folding mechanism of the present invention. The actual heavy folding operation is effected automatically as soon as the hold-down arm 22 is lowered and released from tis raised position. Also, the mechanism holds the shirt in a folded position until the operator has bagged and removed the shirt and then automatically releases the arms of the folding mechanism to automatically return the mechanism to its starting position. These automatically performed operations not only save a great deal of effort and wear on the operator, but also save the operators a great deal of time thereby increasing their efficiency and productivity. In addition, since the actual folding operation is automatic, high quality, uniform folding, without human variation, is insured.

An illustrative embodiment of the invention and an exemplary mechanism effecting these operations is shown in rear elevational views in FIGURES 8 and 9 and fragmentally in plan view in FIGURE 10.

As illustrated in these three figures, wherein the arms 19 and 20 are shown only fragmentally, the arms are coordinated by having the rear portions thereof carry small pinions 25 and 26, respectively, fixed to the arms. The pinions are journaled in arm mounting blocks 27 and 28, respectively (FIGURES 10, 11 and 12), and a portion of each of the arms 19 and 20 extends through its respective mounting blocks 27 and 28 to provide the journals for the arms and the pinions.

The arm mounting blocks 27 and 28 are laterally adjustably carried on a base block 29 which is pivotally connected, as by an elongated pin 30, to a U-shaped bracket 31 (FIGURE 8) secured to the table top 14 of the table 13 at the head end thereof. The bracket 31 has apertured upstanding ears 32 providing the journal connection that receives the pivot pin 30.

The arm mounting blocks 27 and 28 are laterally slidably mounted on a pair of slide rods 33 and 34 for the arm mounting block 27, and 35 and 36 for the arm mounting block 28, which rods extend laterally in pairs from the center portion 37 of the base block 29 to which the arm mounting block supporting rods 33, 34, 35 and 36 are secured. The arm mounting blocks 27 and 28 are mounted in the manner described to permit adjustable positioning thereof laterally of the machine simultaneously so that the operator may adjust the arm positions to provide for different widths of folding for shirts to be folded on the mechanism.

To provide for such adjustment of the lateral position of the arms and the arm mounting blocks 27 and 28, the arm mounting blocks threadably receive a screw rod 38 having left-handed threads 39 (FIGURE 10) at one end thereof engaging the mounting block 28 for the arm 20, and right-handed threads 40 engaging the arm mounting block 27. The screw is held against longitudinal movement with respect to the base block 29 by having a collar 41 (FIGURES 9 and 10) fixed thereon between a pair of flanges 42 on the base block 29.

The rod 38 is provided at one end thereof with a screwdriver receiving slot 43 to facilitate manual rotation of the rod 38 and thus permit manual adjustment of the lateral separation of the arm mounting blocks 27 and 28 and the arms 19 and 20 journaled therein.

The arms themselves are substantially bell crank shaped so that rotation thereof about the journal axes portions 44 and 45 (FIGURES 10, 11 and 12) causes the outer folding ends 46 and 47, shown in FIGURES 1 through 5, to move in large, folding, sweeping arcs of substantially 180 degrees about the journal axes for folding the shirt body, tail and sleeves as described above in conjunction with FIGURES 1 through 7.

As described above, the movement of the arms for the folding operation is coordinated through pinions 25 and 26 carried on the rear ends or journal ends of the arms as shown in detail in FIGURES 8, 10, 11 and 12. These pinions 25 and 26 mesh with gears 48 and 49, respectively, which carry pins 50 and 51, respectively, providing loose connections in slots 52 and 53, respectively, in a pair of racks 54 and 55 slidably mounted in the mechanisms and interconnected through a fixed pinion or gear 56.

The fixed pinion 56 is journaled on a pin 57 mounted in a mounting block 58 which is secured to the central portion 37 of the base block 29. This gear or pinion 56 engages the teeth in the lower rack 54 and the teeth in upper rack 55 to coordinate movement of the racks and thereby coordinate movement of the arms 19 and 20 so that the arms 19 and 20 will move from an open position to a folded position successively and automatically and so that the arms 19 and 20 will move from a folded position to an open position successively and automatically after the shirt folding operation has been completed.

The racks 54 and 55, in this embodiment of the invention are slidably disposed in tracks formed by the mounting block 58 and by a lower rack guide plate 59 and an upper rack guide plate 60 secured to the mounting block 58 (FIGURES 8 and 18). The right-hand end of the lower rack 54, when viewed from the rear as in FIGURE 8, is formed with a vertically enlarged portion 61 provided with a recess 52 which is substantially larger than the pin 50 in a lateral direction so that successive operation of the arms may be effected as described in detail hereinbelow. The pin 50 is biased toward the left edge of the recess 52, as viewed in FIGURE 8, by a spring 62 having one end thereof connected to the pin 50 and the other end thereof connected to a pin 63 at the left end of the enlarged portion 61 of the lower rack 54. The spring 62 biases the gear 49 in a counterclockwise direction thereby biasing the mechanism toward an unfolded position or an open position for the arm 19. One of the important functions of the spring 62, however, is to maintain the pin 50 biased against the left edge (when viewed from the rear) of the recess 52 in the lower rack 54.

Similar structure is provided with respect to the pin 51 and the upper rack 55. The upper rack 55 is provided at its left-hand end (when viewed from the rear as in FIGURE 8) with an enlarged portion 64 which has a recess 53 therein receiving the pin 51 on the gear 49. A spring 65 biases the gear 49 in a counterclockwise direction and biases the pin 51 against the left-hand edge of the recess 53 by having one end thereof connected to the pin 51 and the other end thereof connected to a pin 66 mounted toward the left-hand end of the enlarged portion 64 of the upper rack 55. The recess 53, as was the case with the recess 52, is substantially larger than the pin 51 in a lateral direction to provide for successive and automatic operation of the arms 19 and 20.

The arms 19 and 20 are operated automatically and successively when air is supplied to a cylinder 67. When air is supplied to the cylinder 67, the piston rod 68 thereof moves outwardly toward the left as viewed in FIGURE 8 and, through a pinned connection 69 with a bifurcated lever 70, causes the lever 70 to pivot counterclockwise about a pivot pin 71. The pin 71 is carried at the left end of a mounting arm 72 which is secured to the mounting block 28 for the folding arm 20. The lever 70 also has a pivotal connection to one end of an adjustable link 73, the other end of which is pivotally connected to the pin 66 on the upper rack 55.

As the piston rod 68 moves toward the left under the influence of pneumatic pressure in the cylinder 67, the lever 70 moves to the left thereby pulling the link 73 to the left and causing the upper rack 55 to move toward the left, all as viewed in FIGURE 8. Leftward movement of the rack 55 causes rotation of the gear 56 in a counterclockwise direction thereby moving the rack 54 to the right. Since the pin 50 on the gear 48 is biased against the left-hand edge of the recess 52, movement of the rack 54 will cause immediate movement of the arm 19 in a counterclockwise direction or a folding direction as viewed in FIGURE 8, the arm 19 being connected to the gear 48 through the pinion 25. There will be a delay, however, in the clockwise or folding movement of the arm 20 as viewed in FIGURE 8 since the pin 51 is initially disposed at the left edge of the recess 53 in the upper rack 55. The force of spring 65 is not sufficient to cause the arm 20 to start moving in a folding direction when the upper rack 55 moves since it is not sufficient to lift the arm 20 against the weight of the arm.

As movement continues, the right-hand edge of the recess 53 in the upper rack 55 will engage the pin 51 and cause the gear 49 to rotate in a counterclockwise direction and transmit movement to the arm 20 through the pinion 26. Further continued movement will complete the folding operation and after the arm 20 passes over its top center position, spring 65 will assist in moving it about 180 degrees from an open position to a folded position and thereby move the pin substantially back to the left edge of the recess 53 when the mechanism is in a folded position.

From the foregoing, it will be evident that by virtue of the sizes of the recesses 52 and 53 in the racks 54 and 55, with relation to the sizes of the pins 50 and 51, successive movement and operation of the folding arms is effected automatically when air is admitted to the cylinder 67.

The lost motion arrangement is also effective to successively open the arms by moving the arm 20 in an opening direction prior to moving the arm 19 in an opening direction when the piston rod 68 is moved to the right in FIGURES 8 and 9. When air is released from the cylinder 67, the piston rod 68 is moved to the right under the influence of a spring 74 having one end thereof connected to the upper end of the lever 70 and the other end thereof connected to a pin 75 on the mounting block 76 which supports the head end of the cylinder 67 and is connected to the mounting block 28 for the folding arm 20.

Pressurized air for automatically and sequentially operating the folding arms 19 and 20 is supplied to the cylinder 67 through operation of an arm control valve 78 which is controlled by movement of the hold-down arm 22.

The valve 78, as shown schematically in FIGURE 16, is connected directly in the air supply line 79 for the cylinder 67 and, when in proper operating position, permits air to flow from the air supply line 79 through a needle valve 80 and flow regulator 81, to the cylinder 67 to automatically and sequentially move the arms from an open position to a folded position. When the valve 78 is moved from the immediately above described position to an exhaust position in the manner described in detail below, it exhausts air to an exhaust port shown diagrammatically at 82 in FIGURE 16, permitting the spring 74 to return the cylinder to a closed position thereby unfolding the arms through operation of the double rack and pinion, lost motion mechanism described above.

The hold-down arm mounting by which the valve 78 is operated in this illustrative embodiment of the invention includes a collar 83 to which the hold-down arm 22 is secured as by welding. The collar is rotatably mounted or journaled on a tie rod or a pivot rod 84 which is journaled in bosses 85 and 86 in the arm mounting blocks 27 and 28 and in a boss 87 in the base block 37. A set of collars 89 disposed on opposite sides of the boss 87 restrain the rod 84 against movement axially thereof and laterally with respect to the mechanism. The collar 83 on which the hold-down arm 22 is mounted is disposed between the boss 85 and a flange 90 at the upper surface of the arm mounting block 27 so that adjustment of the position of the mounting blocks 27 and 28 by operation of the screw 38 will also adjustably, laterally position the hold-down arm 22 with respect to the arms 19 and 20 for proper folding of a shirt by the mechanism of the present invention.

Raising and lowering movement of the hold-down arm 22 is transmitted to the tie rod or pivot rod 84 by a U-shaped bracket 91, FIGURES 9 and 11, which has a pair of legs 92 that are secured to the pivot rod or tie rod 84 for co-rotation therewith. The hold-down arm 22 passes through a slot 93 in the bight portion of the bracket 91 and which slot extends for substantially the whole length of the bracket. The elongated slot 93 also permits relative lateral adjustment of the hold-down arm 22 with respect to the machine when the lateral positions of the arms 19 and 20 are adjusted without laterally moving the tie rod 84.

The rotational or up and down movement of the hold-down arm 22 about the tie rod or pivot rod 84 is controlled by a detent and linkage arrangement shown in detail in FIGURE 13 and in phantom lines in FIGURE 11. These parts are also seen in FIGURE 9.

The linkage arrangement includes three links 95, 96 and 97 that are pivotally interconnected between the rod 84 and a mounting bracket 98 secured to the base plate 99 on which the whole mechanism is mounted and which is secured to the top 14 of the table 13 at the head end of the table. The link 96 is pivotally interconnected with the links 95 and 97. One end of the link 95 is pivotally connected to the rod 84 and held against movement axially of the rod by a fixed collar 100. The end of link 97 which is not pivotally connected to the link 96, is secured to the bracket 98 and fixed against pivotal movement with respect thereto by a pair of stops 101 which are adjustable to adjustably position the link 97 for proper operation of the linkage mechanism.

The link 95 carries a laterally projecting pin 102 which extends towards the center of the machine (FIGURE 8) and is disposed at a proper distance from the axis of the rod 84 to cooperate with a tapered ended, resiliently mounted detent pin 103 that is slidably mounted in a detent block 104 secured to the rod 84 for rotational movement with the rod and with the hold-down arm 22.

When the hold-down arm 22 is in a raised position the detent pin 103 will be latched behind the pin 102. Since the pin 103 is resiliently biased outwardly of the block 104 by a spring 105, but held against removal from the block 104 by a stop pin 106, it will hold the hold-down arm 22 in a raised position. The spring 105, however, has only sufficient strength to hold the hold-down arm 22, and only slight manual force is required to cause the detent pin 103 to retract and slide under the holding pin 102 when the hold-down arm 22 is pulled downwardly from the position shown in FIGURE 3 to the position shown in FIGURE 4.

Further, the downward movement of the hold-down arm is assisted by a spring 107, FIGURE 18, having one end thereof biased against the base block 29 and the other end thereof fixed in a collar 108 secured to the tie rod 84 for rotation therewith. The spring 107 winds up and is tensioned when the hold-down arm is raised, and partially unwinds when the hold-down arm is lowered. However, it continues to exert a downward tension force on the hold-down arm so that the hold-down arm will clamp the shirt when it is in the position shown in FIGURE 4.

An arm control valve operating link 109 and a valve operating bar 110 couple the tie rod 84 to the valve mechanism 78 for operating the folding arm control valve 78 when the hold-down arm 22 is lowered to a shirt-holding position. This linkage between the hold-down arm 22 and the valve 78 is best shown in successive stages of operation, more or less diagrammatically in FIGURES 14 and 15, and is also shown in FIGURE 13. The control link 109 is secured to the rod 84 for rotation therewith by a set screw or the like 111 which permits adjustable positioning of the link 109 with respect to the angular position of the hold-down arm 22. The upper or free end of the link 109 is pivotally connected to a valve operating bar 110 by a pivotal connection 112. The rear or free end of the bar 110 has a cutout or a hook 113 therein which faces downwardly to engage a valve operating pin 114 projecting laterally of the valve and mounted on a valve operating cam plate 115 secured to the valve operating lever 116 that is secured to a projecting end of the valve operating shaft 117.

The linkage and valve arrangement is shown in FIGURE 14 in the position thereof when the hold-down arm 22 is in a raised position. The arrangement is shown in FIGURES 13 and 15 in the position thereof when the hold-down arm 22 is lowered to clamp the arms and shoulder portion of the shirt to be folded by the mechanism.

When the hold-down arm 22 is lowered from the position shown in FIGURES 3 and 14 to the position shown in FIGURES 4, 13 and 15, the link 109 will move rotationally with the hold-down arm and will pull the control rod 110 forward of the mechanism so that it will assume the position shown in FIGURES 13 and 15. When this happens, the hook 113 will engage the pin 114 and move the valve operating cam 115, and thereby cause the valve operating shaft 117 to rotate in a counterclockwise direction as viewed in FIGURES 14 and 15 thereby opening the valve and permitting air to flow from the feed line 79 through the needle valve 80 and the regulator 81 to the cylinder 67 to cause the folding arms 19 and 20 to operate automatically and sequentially in the manner described above.

At the conclusion of the shirt folding operation, the hold-down arm 22 is raised to the elevated position shown in FIGURES 9 and 14. When the hold-down arm is raised, the link and lever arrangements 109 and 110 which are connected to the rod 84 will return to the position shown in FIGURE 14. However, return of the lever 110 does not, in this particular embodiment of the invention, return the valve 78 to the position shown in FIGURE 14. It is desired that the lever 110 be so arranged with respect to the valve 78 that it will not cause the valve to return to its open position as shown in FIGURE 14. This is desired since it is also desired that when the mechanism is raised it will stay in a full closed or folded position until after the operator of the mechanism has removed the shirt and released the mechanism.

When the operator releases the mechanism, the valve will be returned to its initial position as shown in FIGURE 14 by a valve return lever 120 shown in FIGURES 8, 13, 14 and 15. In FIGURE 15, the lever is shown in two of its operating positions, the positions being shown in full line when the entire mechanism is closed and shown in dashed lines or phantom lines when the mechanism is raised but still folded. In FIGURE 14, the lever 120 is shown in position with the mechanism raised and open or unfolded.

The return lever 120 has a pin 121 projecting laterally therefrom and disposed to engage a hook face 122 on the valve operating cam 115 so that when the lever is lowered, the pin 121 will project under the cam face 122, and when the lever is raised it will push upwardly on the cam 115 causing the valve to move from the position shown therefor in FIGURE 15 to the position shown therefor in FIGURE 14.

A pin 110' on the lever 110 moves the lever 120 forwardly so as to unhook the pin 121 from the cam face 122 on the cam 115 when the holding arm 22 is moved upwardly so as to permit movement of the valve 78. The relative positions of the pin 110' and the hook 113 on the lever 110 are such that the pin 121 will be unlatched from the cam face 122 prior to engagement between the hook 113 and the pin 114 on the valve operating lever 116 to which the cam 115 is attached.

The vertical movement of valve return lever 120 is controlled by a tie rod 123 to which it is pivotally connected, see FIGURES 8 and 17. The lever is held against displacement from the rod by any convenient means such as pins 124 and is biased toward the valve, angularly about the rod 123 by a spring 125 having one end thereof connected to the pin 124 and having the other end thereof connected directly to the lever 120.

The rod 123 is connected to an intermediate portion of a lever 126 having the lower end thereof pivotally connected by a tie rod 127 to mounting and pivot ears 128 on a depending plate 129 which is secured to the mounting plate 99 and depends therefrom at the head end of the table 13 (FIGURES 8 and 12). The upper free end of the lever 126 is bifurcated to have upstanding legs 130 which receive an actuating pin 131 on which the piston rod 132 of a cylinder 133 is pivotally connected. The head end 134 of the cylinder is pivotally connected as at 135 to a bracket 136 at the upper end of the plate 129 where the plate is secured to the mounting plate 99.

Operation of the cylinder 133 and the admission of pneumatic pressure thereto is controlled by a master control, foot-operated valve 137 (FIGURE 16). When the foot pedal 138 is depressed by the operator, against the force of a biasing spring 139, the valve is opened and air passes through the valve from a supply line 140 and through a flow regulator 141 to the cylinder 133. This causes the cylinder 133 to extend thereby pivoting the lever 126 downwardly and counterclockwise about the axis of the pin 127, as seen in FIGURE 17, so that the rod 123 moves outwardly and downwardly at the same time.

When the rod 123 moves downwardly, it pulls the lever 120 downwardly therewith and the biasing spring 125 moves the lever rearwardly against the valve cam 115. The combination of these two movements permits the pin 121 to seat under the cam face 122 on the valve cam 115 when the cylinder 133 is fully extended.

When the operator releases the foot pedal 138, the valve 137 will close the air supply from the line 140 and permit it to exhaust from the cylinder 133. A spring 142 tied between the actuating pin 131 and the bracket 136 at the upper end of the plate 129 returns the cylinder 133 to a closed position and thereby returns the lever 126 and the rod 123 to their initial or raised position. This upward movement of the rod 123 to its initial or normal position, raises the lever 120 and thereby causes the pin 121 to raise operating cam for the valve 78 upwardly to its starting position, from the position shown in FIGURE 15 to the position shown in FIGURE 14.

As stated above, when the valve 78 is moved from the position shown in FIGURE 13 to the position shown in FIGURE 14, it will close the air supply line 79 thereby permitting the air to exhaust from the cylinder 67 so that the folding arms 19 and 20 will move from a folded position to an open position.

The cylinder 133 also is effective to raise the mechanism from the lowered position shown in FIGURE 6 to the raised position shown in FIGURE 7 pneumatically by operation of the control valve 137. When the cylinder 133 is extended, and the pin 131 is lowered, the pin will strike an ear 143 (FIGURES 8 and 12) on a pattern blade and mechanism lifting lever 144 which is mounted on the pivot pin 127, which extends through a boss 145 at the foot end of the lever 144. At its upper end, the lever 144 is connected by an adjustable link 146 to a crank arm 147 pivotally mounted on the main pivot rod 30. The crank 147 is welded or otherwise secured to a pair of crank arm plates 148 which overlie and underlie the blade 21. Thus, when the air cylinder is extended, it will push upwardly on the pin 131 causing the link 146 to move downwardly thereby rotating the crank 147 in a counterclockwise direction as viewed in FIGURES 17 and 18. This will cause the crank arm blade 148 to raise and thereby lift the blade 21. When the blade 21 lifts, it will pivot around the shaft or pivot pin 30 since the rear end of the blade is wrapped therearound as indicated at 149. Raising of the blade 21, since the blade is under the mechanism and under the base block 29, will cause the whole mechanism to raise.

The lifting of the mechanism by the extension of cylinder 33 is assisted by a spring 150 which is biased between a stud 151 pivotally mounted on a boss 152 on the lever 144, and a washer 153 held against unlimited upward movement by pin 154 on an arm 155 pivotally mounted on an ear 156 on the plate 129. The arm 155 projects through the pivoting stud 151 as shown in FIGURE 12.

The spring 150 also serves to hold the mechanism in a lifted position so that the mechanism will be maintained in an open position and be ready to use without maintaining air pressure in the cylinder 33.

The pneumatic system shown in FIGURE 16 is effective to close or contract the collar mold at the same time that the cylinder 133 is actuated to raise the folding blade 21 and the remainder of the mechanism, so that the shirt collar will be released from the collar mold when the mechanism is raised from the position shown in FIGURE 6 to the position shown in FIGURE 7. This operation is effected by connecting a cylinder 158 in parallel with the blade-lift cylinder 133. The air mold cylinder 158 is connected to the mechanism in a manner well known in the art. It is supplied with air to contract the collar mold whenever the foot pedal 138 is depressed, the air flow to the cylinder being controlled by a needle valve 159 which controls the rate of opening and closing of the collar mold. The collar mold is expanded by a spring mechanism therein which also serves to contract the cylinder when air is released therefrom, such as when the foot pedal 138 is released and returned to its normal position by spring 139 thereby moving the valve 137 to a position where air can be exhausted from cylinders 133 and 158.

Thus, when the foot pedal 138 is depressed, it will contract the collar mold and also raise the mechanism to the position shown in FIGURE 7. When the foot pedal is released, the cylinders will contract thereby permitting the collar mold to expand and permitting the folding mechanism to unfold to the position therefor in FIGURES 1 and 2. At the same time, if the mechanism is permitted to unfold, the contraction of the cylinder 133 is effective to release the tail clamp 23 from its clamping position on the shirt. The tail clamp is shown in detail in FIGURES 8, 9, 17 and 18. As seen in FIGURE 18, the tail clamp 23 is comprised of a resilient blade 160 secured to a pivotally mounted lever 161 having notches 162 and 163 at its upper rearward end. The block is pivotally mounted on a pin 164 provided on a mounting block 165 secured to the upper surface of the base block 29.

The notches 162 and 163 in the upper rearward end of the lever 161 are cooperatively arranged with a catch end 166 of a pivotally mounted tail clamp latch 167 carried on a pivot pin 168 on a support bracket 169 mounted on the block 58. A spring 170 has one end thereof secured to the bracket 169, the other end thereof engaging the latch 167 near the end 166 thereof and biasing the end 166 downwardly or forwardly in a direction toward latching notches 162 and 163.

When the tail clamp is in the lowered position as shown in FIGURE 18, the spring 170 will bias the latch into one of the notches 162 and 163 so that when the tail clamp is released, it cannot return to its upstanding normal position towards which it is biased by the spring 171, FIGURE 9. The spring 171 has one end thereof fixed to the block 165 and the other end thereof engaging the lever 161 to bias the tail clamp in a counterclockwise or released direction. A plurality of notches 162 and 163 are provided so that the tail clamp may be most effectively operated with any weight of shirt or other garment and with any amount of material to be disposed under the tail clamp. (A short sleeve shirt will require substantially less tail clamp space between the tail clamp and the blade than will a long sleeve shirt.)

When the mechanism is raised and the raising mechanism is released by release of the foot pedal 138, the tail clamp will be released by a release rod 172 which is connected to the tie rod 123 and which projects upwardly through an aperture in plate 99. The upper end 173 of the rod 172 is bent forwardly of the mechanism and is positioned to engage a release cam face 174 on the latch 167. When the mechanism is in a raised position, by extension of the cylinder 133, the cam face 174 of the tail clamp latch 167 will overlie the bent end 173 on the clamp release rod 172, and the clamp rod 172 will be in a released position with the bent end 173 disposed adjacent the plate 99. When air is released from the cylinder 133, the rod 172 will raise and contact the cam face portion 174 of the latch 167 thereby causing it to rotate in a counterclockwise direction as viewed in FIGURES 17 and 18. This will cause the latch end 166 to be removed from the notch 162 or 163 in the tail clamp lever 161 thereby releasing the tail clamp for movement thereof in a counterclockwise direction as viewed in FIGURE 18, to a fully open or released position under the force of biasing spring 171.

From the foregoing, it will be observed that the operation of the machine is substantially as follows:

At the outset, with the mechanism in a fully opened and released position as viewed in FIGURE 1, the operator will depress foot pedal 138 thereby admitting air to cylinders 158 and 133. Since the mechanism is in a raised and open position, actuation of cylinder 133 will have no effect. Actuation of cylinder 158, however, will contract the collar mold 16 whereby the operator can place the collar of the shirt to be folded over the collar mold. The operator will then release the foot pedal 138 returning the valve 137 to its normal position so that air can exhaust from the cylinders 133 and 158 and a spring in the collar mold will cause the mold to expand to shape and clamp the shirt collar.

The operator will then straighten the tail and back portions of the shirt and lower the blade 21 against the force of the biasing spring 150 and the mechanism will be lowered with it with the folding arms 19 and 20 in an extended position resting on the padded arm rests 19' and 20' secured to the arm mounting blocks 27 and 28. The hold-down arm 22, however, will remain in a raised position and will be held in that position by the detent pin 103 coacting with the pin 102 on lever 95 as shown in FIGURES 11 and 13.

When the arms of the shirt have been folded over the folding arms, as shown in FIGURE 4, the hold-down arm 22 is lowered thereby causing the lever 110 to move the valve 78 to its actuator or open position as shown in FIGURE 15. This permits air to flow to the arm cylinder 67 causing the arms to automatically and sequentially close through actuation of the racks 54 and 55 coupled together through pinion 56, and through operation of the racks against the pins 50 and 51 on the carriers 48 and 49 thereby causing pinions 25 and 26 to rotate and close the arms, sequentially, to the folded position shown therefor in FIGURE 5.

The operator then folds the shirt tail and manually lowers the tail clamp 23 to a locked position as shown in FIGURES 6 and 18. Then the operator again depresses the foot pedal 138 causing contraction of the collar mold by actuation of the cylinder 158 and causing the mechanism to lift by actuation of the cylinder 133. The operator then bags the shirt and removes it from the mechanism after which she releases the foot pedal 138. This returns the valve 137 which is connected to the foot pedal 138, to its exhausting position whereby air is exhausted from the blade lift cylinder 133. The spring 142 then lifts the lever 126 causing the pin 121 on the lever 120 to return the arm control valve 78 to its normal position for exhausting the cylinder 67 for sequential opening of the arms, and lifts the rod 172 which releases the tail clamp 23.

From the foregoing it will also be observed that numerous other variations and modifications may be effected without departing from the true spirit and scope of the novel concepts and principles of this invention.

I claim:

1. In a device for folding garments and having a support block and a pair of folding arms pivotally mounted on said support block, means to pivotally move each of said arms from an outwardly extended open position to an inwardly disposed folded position, and means to coordinate the operation of said means to pivotally move each of said arms to control the movement thereof whereby said arms are moved sequentially for sequential folding of the opposite sides respectively of a garment, said device further including a third arm of a length sufficient to provide a folding edge for at least a portion of a garment to be folded on the device and pivotally mounted on said support block and movable between an upwardly extending open position and a lowered position for holding a garment in place and to provide a folding edge about which at least a portion of the garment is folded during the folding operation, and means to control the moving means for said pair of arms and to control the coordinating means for the moving means.

2. In a device for folding garments and having a support block and a pair of folding arms pivotally mounted on said support block, a pinion secured to each of said arms and rotatable therewith, a third pinion rotatably mounted on said support block, a pair of racks disposed in toothed engagement with said third pinion and a lost motion connection between said racks and said arms, respectively, for coordinated sequential movement of said arms whereby said arms are moved sequentially for sequential folding of the opposite sides respectively of a garment.

3. In a device for folding garments and having a support block and a pair of folding arms pivotally mounted on said support block, a pinion secured to each of said arms and rotatable therewith, a third pinion rotatably mounted on said support block, a pair of racks disposed in toothed engagement with said third pinion, a lost motion connection between said racks and said arms, respectively, for coordinated sequential movement of said arms whereby said arms are moved sequentially for sequential folding of the opposite sides respectively of a garment, power drive means connected to said racks and pinions, a third arm pivotally mounted on said support block and movable between an upwardly extending open position and lowered position for holding a garment in place, and actuating means and control means for said power drive means connected to said third pivotally movable arm to actuate said power drive means for sequential operation of said pair of folding arms when said third arm is lowered.

4. In a device for folding garments and having a support block and a pair of folding arms pivotally mounted on said support block, means connected to each of said arms to rotate the same between an outwardly extended open position and an inwardly disposed folded position, simultaneously operating drive members for operating said means, a lost motion connection between said members and said means whereby said arms are moved sequentially for sequential folding of the opposite sides respectively of a garment, power drive means connected to one of said drive members to power drive said folding arms between said positions therefor, a third arm pivotally mounted on said support block and movable between an upwardly extending open position and a lowered position for holding a garment in place, and actuating means and control means for said power drive means connected to said third pivotally movable arm to actuate said power drive means for sequential operation of said pair of folding arms when said third arm is lowered.

5. In a device for folding garments and having a support block and a pair of folding arms pivotally mounted on said support block, a drive system for said arms comprising means connected to each of said arms to rotate the same between an outwardly extended open position and an inwardly disposed folded position, drive members connected to said means and to each other for coordinated movement thereof, at least one of the connections between said drive members with each other and with said means to rotate said arms being a lost motion connection whereby said arms are moved sequentially for sequential folding of the opposite sides respectively of a garment, power drive means connected to one of said drive members to power drive said folding arms between said positions therefor, a third arm pivotally mounted on said support block and movable between an upwardly extending open position and a lowered position for holding a garment in place, and actuating means and control means for said power drive means connected to said third pivotally movable arm to actuate said power drive means for sequential operation of said pair of folding arms when said third arm is lowered.

6. In a device for folding garments and having a support block and a pair of folding arms pivotally mounted on said support block, a drive system for said arms comprising means connected to each of said arms to rotate the same between an outwardly extended open position and an inwardly disposed folded position, drive members connected to said means and to each other for coordinated movement thereof, at least one of the connections between said drive members with each other and with said means to rotate said arms being a lost motion connection whereby said arms are moved sequentially for sequential folding of the opposite sides respectively of a garment, power drive means connected to one of said drive members to power drive said folding arms between said positions therefor, a third arm pivotally mounted on said support member and movable between an open position and a closed position for holding a garment in place, and actuating means connected to said third movable arm and said power drive means to controllably actuate said power drive means for sequential operation of said pair of folding arms when said third arm is moved to a closed position.

7. In a device for folding garments and having a support block and a pair of folding arms pivotally mounted on said support block, a drive system for said arms comprising means connected to each of said arms to rotate the same between an outwardly extended open position and an inwardly disposed folded position, drive members connected to said means and to each other for coordinated movement thereof, at least one of the connections between said drive members with each other and with said means to rotate said arms being a lost motion connection whereby said arms are moved sequentially for sequential folding of the opposite sides respectively of a garment, power drive means connected to one of said drive members to power drive said folding arms between said positions therefor, a third arm pivotally mounted on said support block and movable between an open position and a closed position for holding a garment in place, actuating means connected to said third movable arm and said power drive means to controllably actuate said power drive means for sequential operation of said pair of folding arms when said third arm is moved to a closed position, and power means to pivotally raise all of said arms and connected to said actuating means to reverse the operation of said power drive means to move said pair of folding arms to an open position.

8. In a device for folding garments and having a support block and a pair of folding arms pivotally mounted on said support block, a pinion secured to each of said arms and rotatable therewith, a third pinion rotatably mounted on said support block, a pair of racks disposed in toothed engagement with said third pinion, a lost motion connection between said racks and said arms, respectively, for coordinated sequential movement of said arms whereby said arms are moved sequentially for sequential folding of the opposite sides respectively of a garment, power drive means connected to said racks and pinions, a third arm pivotally mounted on said support block and movable between an upwardly extending open position and lowered position for holding a garment in place, actuating means and control means for said power drive means connected to said third pivotally movable arm to actuate said power drive means for sequential operation of said pair of folding arms when said third arm is lowered, and power means to pivotally raise all of said arms and connected to said actuating means to reverse the operation of said power drive means to move said pair of folding arms to an open position.

9. In a device for folding garments and having a support block and a pair of folding arm pivotally mounted on said support block, a pinion secured to each of said arms and rotatable therewith, a third pinion rotatably mounted on said support block, a pair of racks disposed in toothed engagement with said third pinion and a lost motion connection between said racks and said arms, respectively, for coordinated sequential movement of said arms whereby said arms are moved sequentially for sequential folding of the opposite sides respectively of a garment, a pneumatic piston-cylinder assembly mounted on said support block and connected to one of said racks, a third pivotally movable arm mounted on said support block and movable between an upwardly extending open position and a lowered position for holding a garment in place, a control valve connected to said piston-cylinder assembly to control the flow of air to and from said piston-cylinder assembly, and a link connection between said third arm and said control valve to open said valve when said third arm is moved to a garment holding position to actuate such piston-cylinder assembly to sequentially move said folding arms to a folded position.

10. In a device for folding garments and having a support block and a pair of folding arms pivotally mounted on said support block, a pinion secured to each of said arms and rotatable therewith, a third pinion rotatably mounted on said support block, a pair of racks disposed in toothed engagement with said third pinion and a lost motion connection between said racks and said arms, respectively, for coordinated sequential movement of said arms whereby said arms are moved sequentially for sequential folding of the opposite sides respectively of a garment, a pneumatic piston-cylinder assembly mounted on said support block and connected to one of said racks, a third pivotally movable arm mounted on said support block and movable between an upwardly extending open position and a lowered position for holding a garment in place, a control valve connected to said piston-cylinder assembly to control the flow of air to and from said piston-cylinder assembly, a link connection between said third arm and said control valve to open said valve when said third arm is moved to a garment holding position to actuate such piston-cylinder assembly to sequentially move said folding arms to a folded position, a second pneumatic piston-cylinder assembly connected to said support block and disposed to move said folding arms between a lowered working position and a raised position, and a link connection between said second piston-cylinder assembly and said control valve to return said control valve to its initial position to deactivate the first piston-cylinder assembly to move said folding arms from a closed position to an open position when the second piston-cylinder assembly is deactivated.

11. In a device for folding garments and having a support block and a pair of folding arms pivotally mounted on said support block, a pinion secured to each of said arms and rotatable therewith, a third pinion rotatably mounted on said support block, a pair of racks disposed in toothed engagement with said third pinion and a lost motion connection between said racks and said arms, respectively, for coordinated sequential movement of said arms whereby said arms are moved sequentially for sequential folding of the opposite sides respectively of a garment, a pneumatic piston-cylinder assembly mounted on said support block and connected to one of said racks, a third pivotally movable arm mounted on said support block and movable between an upwardly extending open position and a lowered position for holding a garment in place, a control valve connected to said piston-cylinder assembly to control the flow of air to and from said piston-cylinder assembly, a link connection between said third arm and said control valve to open said valve when said third arm is moved to a garment holding position to actuate such piston-cylinder assembly to sequentially move said folding arms to a folded position, a second pneumatic piston-cylinder assembly connected to said support block and disposed to move said folding arms between a lowered working position and a raised position, a link connection between said second piston-cylinder assembly and said control valve to return said control valve to its initial position to deactivate the first piston-cylinder assembly to move said folding arms from a closed position to an open position when the second piston-cylinder assembly is deactivated, and a manually operable control valve connected to said second piston-cylinder assembly.

12. In a device for folding garments and having a support block and a pair of folding arms pivotally mounted on said support block, a drive system for said arms comprising means connected to each of said arms to rotate the same between an outwardly extended open position and an inwardly disposed folded position, drive members connected to said means and to each other for coordinated movement thereof, at least one of the connections between said drive members with each other and with said means to rotate said arms being a lost motion connection whereby said arms are moved sequentially for sequential folding of the opposite sides respectively of a garment, power drive means connected to one of said drive members to power drive said folding arms between said positions therefor, a third arm pivotally mounted on said support block and movable between an open position and a closed position for holding a garment in place, actuating means connected to said third movable arm and said power drive means to controllably actuate said power drive means for sequential operation of said pair of folding arms when said third arm is moved to a closed position, power means to pivotally raise all of said arms and connected to said actuating means to reverse the operation of said power drive means to move said pair of folding arms to an open position, a fourth arm pivotally mounted on said support block and movable between an upwardly extending open position and a lowered garment clamping position, and link means connected to said power means to release said fourth arm from a garment clamping position for return thereof to an open position when said power means is deactivated.

13. A device for folding garments is operative assembly with a garment folding table and means in the table to clamp and mold portions of the garment, comprising a folding blade, a support block, means pivotally mounting said support block and said folding blade on the folding table, a pair of folding arms pivotally mounted on said support block, means to pivotally move each of said arms from an outwardly extended open position to an inwardly disposed folded position, and means to coordinate the operation of said means to pivotally move each of said arms to control the movement thereof whereby said arms are moved sequentially for sequential folding of the opposite sides respectively of a garment, said device further including a third arm and to provide a folding edge about which at least a portion of the garment is folded during the folding operation pivotally mounted on said support block and movable between an upwardly extending open position and a lowered position for holding a garment in place and to provide a folding edge about which at least a portion of the garment is folded during the folding operation, and means to control the moving means for said pair of arms and to control the coordinating means for the moving means.

14. A device for folding garments in operative assembly with a garment folding table and means in the table to clamp and mold portions of the garment, comprising a folding blade, a support block, means pivotally mounting said support block and said folding blade on the folding table, a pair of folding arms pivotally mounted on said support block, a pinion secured to each of said arms and rotatable therewith, a third pinion rotatably mounted on said support block, a pair of racks disposed in toothed engagement with said third pinion and a lost motion connection between said racks and said arms, respectively, for coordinated sequential movement of said arms whereby said arms are moved sequentially for sequential folding of the opposite sides respectively of a garment.

15. A device for folding garments in operative assembly with a garment folding table and means in the table to clamp and mold portions of the garment, comprising a folding blade, a support block, means pivotally mounting said support block and said folding blade on the folding table, a pair of folding arms pivotally mounted on said support block, a pinion secured to each of said arms and rotatable therewith, a third pinion rotatably mounted on said support block, a pair of racks disposed in toothed engagement with said third pinion, a lost motion connection between said racks and said arms, respectively, for coordinated sequential movement of said arms whereby said arms are moved sequentially for sequential folding of the opposite sides respectively of a garment, power drive means connected to said racks and pinions, a third arm pivotally mounted on said support block and movable between an upwardly extending open position and lowered position for holding a garment in place, and actuating means and control means for said power drive means connected to said third pivotally movable arm to actuate said power drive means for sequential operation of said pair of folding arms when said third arm is lowered.

16. A device for folding garments in operative assembly with a garment folding table and means in the table to clamp and mold portions of the garment, comprising a folding blade, a support block, means pivotally mounting said support block and said folding blade on the folding table, a pair of folding arms pivotally mounted on said support block, a drive system for said arms comprising means connected to each of said arms to rotate the same between an outwardly extended open position and an inwardly disposed folded position, drive members connected to said means and to each other for coordinated movement thereof, at least one of the connections between said drive members with each other and with said means to rotate said arms being a lost motion connection whereby said arms are moved sequentially for sequential folding of the opposite sides respectively of a garment, power drive means connected to one of said drive members to power drive said folding arms between said positions therefor, a third arm pivotally mounted on said support block and movable between an open position and a closed position for holding a garment in place, and actuating means connected to said third movable arm and said power drive means to controllably actuate said power drive means for sequential operation of said pair of folding arms when said third arm is moved to a closed position.

17. A device for folding garments in operative assembly with a garment folding table and means in the table to clamp and mold portions of the garment, comprising a folding blade, a support block, means pivotally mounting said support block and said folding blade on the folding table, a pair of folding arms pivotally mounted on said support block, a drive system for said arms comprising means connected to each of said arms to rotate the same between an outwardly extended open position and an inwardly disposed folded position, drive members connected to said means and to each other for coordinated movement thereof, at least one of the connections between said drive members with each other and with said means to rotate said arms being a lost motion connection whereby said arms are moved sequentially for sequential folding of the opposite sides respectively of a garment, power drive means connected to one of said drive members to power drive said folding arms between said positions therefor, a third arm pivotally mounted on said support block and movable between an open position and a closed position for holding a garment in place, actuating means connected to said third movable arm and said power drive means to controllably actuate said power drive means for sequential operation of said pair of folding arms when said third arm is moved to a closed position, and power means to pivotally raise all of said arms and said support block and said folding blade and connected to said actuating means to reverse the operation of said power drive means to move said pair of folding arms to an open position.

18. A device for folding garments in operative assembly with a garment folding table and means in the table to clamp and mold portions of the garment, comprising a folding blade, a support block, means pivotally mounting said support block and said folding blade on the folding table, a pair of folding arms pivotally mounted on said support block, a pinion secured to each of said arms and rotatable therewith, a third pinion rotatably mounted on said support block, a pair of racks disposed in toothed engagement with said third pinion and a lost motion connection between said racks and said arms, respectively, for coordinated sequential movement of said arms whereby said arms are moved sequentially for sequential folding of the opposite sides respectively of a garment, a pneumatic piston-cylinder assembly mounted on said support block and connected to one of said racks, a third pivotally movable arm mounted on said support block and movable between an upwardly extending open position and a lowered position for holding a garment in place, a control valve connected to said piston-cylinder assembly to control the flow of air to and from said piston-cylinder assembly, a link connection between said third arm and said control valve to open said valve when said third arm is moved to a garment holding position to actuate such piston-cylinder assembly to sequentially move said folding arms to a folded position, a second pneumatic piston-cylinder assembly connected to said support block and to said folding blade and disposed to move said folding arms and said blade between a lowered working position and a raised position, and a link connection between said second piston-cylinder assembly and said control valve to return said control valve to its initial position to deactivate the first piston-cylinder assembly to move said folding arms from a closed position to an open position when the second piston-cylinder assembly is deactivated.

19. A device for folding garments in operative assembly with a garment folding table and means in the table to clamp and mold portions of the garment, comprising a folding blade, a support block, means pivotally mounting said support block and said folding blade on the folding table, a pair of folding arms pivotally mounted on said support block, a drive system for said arms comprising means connected to each of said arms to rotate the same between an outwardly extended open position and an inwardly disposed folded position, drive members connected to said means and to each other for coordinated movement thereof, at least one of the connections between said drive members with each other and with said means to rotate said arms being a lost motion connection whereby said arms are moved sequentially for sequential folding of the opposite sides respectively of a garment, power drive means connected to one of said drive members to power drive said folding arms between said positions therefor, a third arm pivotally mounted on said support block and movable between an open position and a closed position for holding a garment in place, actuating means connected to said third movable arm and said power drive means to controllably actuate said power drive means for sequential operation of said pair of folding arms when said third arm is moved to a closed position, power means to pivotally raise all of said arms and connected to said actuating means to reverse the operation of said power drive means to move said pair of folding arms to an open position, a fourth pivotally movable arm movable between an upwardly extending open position and a lowered garment clamping position, and link means connected to said power means to release said fourth arm from a garment clamping position for return thereof to an open position when said power means is deactivated.

References Cited in the file of this patent

UNITED STATES PATENTS

| | | |
|---|---|---|
| 2,285,063 | Steele | June 2, 1942 |
| 2,362,976 | Cooper | Nov. 21, 1944 |
| 2,508,108 | Gayring et al. | May 16, 1950 |
| 2,629,519 | Neckel | Feb. 24, 1953 |
| 2,629,521 | Johnson et al. | Feb. 24, 1953 |
| 2,727,660 | Neckel | Dec. 20, 1955 |
| 2,894,667 | Campbell et al. | July 14, 1959 |
| 2,913,155 | Maxwell et al. | Nov. 17, 1959 |
| 2,913,156 | Pearson et al. | Nov. 17, 1959 |
| 2,950,848 | Gayring | Aug. 30, 1960 |
| 2,954,908 | Plehal | Oct. 4, 1960 |